United States Patent
Kagami et al.

(10) Patent No.: US 10,289,221 B2
(45) Date of Patent: May 14, 2019

(54) ELECTROSTATIC PEN

(71) Applicant: Wacom Co., Ltd., Saitama (JP)

(72) Inventors: Tomohiro Kagami, Tokyo (JP); Yasuo Oda, Saitama (JP)

(73) Assignee: WACOM., LTD., Saitama (JP)

( * ) Notice: Subject to any disclaimer, the term of this patent is extended or adjusted under 35 U.S.C. 154(b) by 10 days.

(21) Appl. No.: 15/473,017

(22) Filed: Mar. 29, 2017

(65) Prior Publication Data

US 2017/0220138 A1    Aug. 3, 2017
US 2018/0052532 A9    Feb. 22, 2018

Related U.S. Application Data

(63) Continuation of application No. PCT/JP2015/052447, filed on Jan. 29, 2015.

(51) Int. Cl.
  *G06F 3/038*    (2013.01)
  *G06F 3/044*    (2006.01)
  *G06F 3/0354*   (2013.01)

(52) U.S. Cl.
  CPC ........ *G06F 3/0383* (2013.01); *G06F 3/03545* (2013.01); *G06F 3/044* (2013.01)

(58) Field of Classification Search
  CPC ...... G06F 3/046; G06F 3/03545; G06F 3/044; G06F 3/0416; G06F 3/0383
  See application file for complete search history.

(56) References Cited

U.S. PATENT DOCUMENTS

| | | | | |
|---|---|---|---|---|
| 4,401,999 | A * | 8/1983 | Brown, Jr. | B41J 2/40 347/142 |
| 2007/0222737 | A1 * | 9/2007 | Kimura | G09G 3/3266 345/100 |
| 2011/0193776 | A1 * | 8/2011 | Oda | G06F 3/046 345/157 |
| 2012/0068964 | A1 | 3/2012 | Wright et al. | |
| 2012/0327040 | A1 * | 12/2012 | Simon | G06F 3/03545 345/179 |
| 2013/0050154 | A1 | 2/2013 | Guy et al. | |
| 2016/0070373 | A1 * | 3/2016 | Hamaguchi | G06F 3/044 345/174 |
| 2017/0108984 | A1 * | 4/2017 | Takaya | G06F 3/03 |

OTHER PUBLICATIONS

International Search Report and Written Opinion of the International Searching Authority, dated Apr. 21, 2015, for International Application No. PCT/JP2015/052447, 20 pages (with English Translation).

* cited by examiner

*Primary Examiner* — Yuzhen Shen
(74) *Attorney, Agent, or Firm* — Seed IP Law Group LLP

(57) ABSTRACT

An electrostatic pen has a switch, control circuitry to control the switch and a pen point electrode. The switch has first, second and third terminals and a first diode having an anode coupled to the first terminal and a cathode coupled to the third terminal. The pen point electrode is coupled to the first terminal of the switch. The control circuitry, in operation, supplies respective potentials to the second terminal and the third terminal of the switch and switches between two or more states including a first state in which a potential of the second terminal is higher than a potential of the third terminal and a second state in which the potential of the second terminal is equal to or lower than the potential of the third terminal.

25 Claims, 11 Drawing Sheets

ELECTROSTATIC PEN

BACKGROUND

Technical Field

The present disclosure relates to an electrostatic pen, and particularly to a passive type electrostatic pen configured to send information by turning on and off a switch provided between a main body and a pen point.

Description of the Related Art

Capacitance type input systems are known which are configured to enable an indicator such as a finger, a conductive touch pen, or the like to indicate a position within the surface of a touch sensor. In a capacitance type input system, the touch sensor using a projective type mutual capacitance system is a position detecting device configured to be able to detect the position of an indicator. The position detecting device includes, within a sensor surface, a plurality of X-direction electrodes each extending in an X-direction and a plurality of Y-direction electrodes each extending in a Y-direction. When a signal including an alternating-current component (which signal will hereinafter be referred to simply as a "current") is fed from an X-direction electrode to a Y-direction electrode in a state in which the indicator has approached the point of intersection of the X-direction electrode and the Y-direction electrode, part of the current that should normally flow to the Y-electrode branches and flows to the indicator. Thus, the current detected in the Y-direction electrode is decreased. The position detecting device is configured to detect the position of the indicator by detecting the change in the detected current in each of the plurality of Y-direction electrodes.

The current flows from the position detecting device used in the capacitance type input system to the indicator because the indicator is grounded through a human body and a current path occurs between the tip of the indicator and a grounding terminal. Many of the pens now commercially available as pens for a touch sensor (which pens are referred to as a touch pen, a stylus for the capacitance type, a passive ES (electrostatic) pen, and the like, and will hereinafter be referred to as "passive type electrostatic pens") have a grounding section in contact with the human body at some position of a casing, and thus provide the current path. Hence, when the indicator is formed of an insulator, for example, the current path as described above does not occur, and therefore the position detecting device cannot detect the position of the indicator.

Currently existing passive type electrostatic pens cannot transmit information other than an indicated position (which information is pen pressure, a pen type, the on-off state of a switch, and the like) to the position detecting device unless the passive type electrostatic pens are configured to be able to use a separate communication channel such as Bluetooth (registered trademark) or the like. However, a technology is known which utilizes the above-described property and enables even a passive type electrostatic pen to transmit information such as pen pressure and the like to the position detecting device without a special communication channel being prepared. This technology will be described in detail in the following.

An electrostatic pen capable of transmitting information includes: a main body formed of a conductor; a pen point electrode that is a conductor insulated from the main body; a switch provided between the pen point electrode and the main body; and a control section that controls the on-off state of the switch according to the transmission information. When the switch is on, the above-described current path occurs, so that the current detected in a Y-direction electrode is relatively decreased. When the switch is off, on the other hand, the above-described current path does not occur, so that the current detected in the Y-direction electrode is relatively increased. The position detecting device can obtain the on-off state of the switch from such a change in the detected current, and can therefore obtain the information transmitted by the electrostatic pen.

U.S. Patent Application Publication No. 2012/0,327,040 (hereinafter referred to as Patent Document 1) discloses an example of an electrostatic pen capable of transmitting information. In this electrostatic pen, a MOS (metal oxide semiconductor) transistor is used as the above-described switch. In addition, Patent Document 1 discloses a technology that enables identification of the kind of a touching indicator (whether the touching indicator is an electrostatic pen or another kind of indicator such as a finger or the like) and identification of an individual indicator by transmitting a signal of an arbitrary frequency from the electrostatic pen (see paragraph [0044] and the like) and a technology that enables transmission of information from the electrostatic pen by transmission of a signal encoded by using Morse code, for example (see paragraph [0043] and the like).

BRIEF SUMMARY

However, when a MOS transistor is used as the switch for changing a conduction state between the pen point electrode and the main body, the accuracy of information detection in the position detecting device is lowered. That is, the MOS transistor has a very high stray capacitance (for example 10 pF). Thus, even after the MOS transistor is turned off, a current flows from the position detecting device to the electrostatic pen through this stray capacitance. The flow of such a current reduces a difference between the current detected in the Y-direction electrode when the switch is on and the current detected in the Y-direction electrode when the switch is off. As a result, the accuracy of information detection in the position detecting device is lowered (bit error occurrence rate is increased). Incidentally, a similar problem occurs also when an ordinary bipolar transistor is used as the switch. Some bipolar transistors for high frequencies have a stray capacitance of 1 pF or less. However, the bipolar transistors for high frequencies are susceptible to static electricity, and therefore cannot be reliably used in practice.

An embodiment facilitates providing an electrostatic pen that increases the accuracy of information detection in the position detecting device.

In addition, the conventional electrostatic pens of the type performing information transmission are designed on an assumption that the information transmission continues to be performed at all times. Patent Document 1 does not disclose anything about cases where the electrostatic pen of the type performing information transmission does not perform information transmission. In such a situation, if the electrostatic pen of the type performing information transmission is provided with a period in which information transmission is not performed, and the above-described switch is off during that period, a state in which no current path is formed between the tip of the indicator and the grounding terminal is continued. A problem thus occurs in position detection.

An embodiment facilitates providing an electrostatic pen that does not cause a problem in position detection even when the electrostatic pen of the type performing information transmission is provided with a period in which information transmission is not performed.

Further, it is difficult to obtain an intermediate state between an on state and an off state in MOS transistors and bipolar transistors. As a result, conventional input systems cannot use multilevel modulation for transmission of information from the electrostatic pen.

An embodiment facilitates providing an electrostatic pen that transmits information using multilevel modulation.

In an embodiment, an electrostatic pen includes: a switch section having first to third terminal parts; a pen point electrode coupled to the first terminal part; and a control section switching between a first state in which a potential of the second terminal part is higher than a potential of the third terminal part and a second state in which the potential of the second terminal part is equal to or lower than the potential of the third terminal part, by supplying the second terminal part and the third terminal part with the respective potentials; the switch section including a first diode having an anode connected to the first terminal part and having a cathode connected to the third terminal part.

In the electrostatic pen, the switch section may include a reverse-current preventing unit disposed between the first terminal part and the second terminal part, the reverse-current preventing unit preventing a current from flowing from the first terminal part to the second terminal part.

In an embodiment, in the electrostatic pen, the control section may supply a control signal to the second terminal part and supply an inverted signal of the control signal to the third terminal part, and control a potential difference between the control signal and the inverted signal to two levels or more.

In an embodiment, there is provided an electrostatic pen for use together with an electronic apparatus including a capacitance type sensor, the electrostatic pen including: a pen point electrode; a grounding section; a switch section having one terminal connected to the pen point electrode and having another terminal connected to the grounding section; and a control section configured to be able to transmit information to the electronic apparatus by controlling an on-off state of the switch section; when the control section does not transmit information to the electronic apparatus, the control section setting the pen point electrode and the grounding section in a state of being electrically connected to each other by setting the switch section in an on state.

In an embodiment, there is provided an electrostatic pen for use together with an electronic apparatus including a capacitance type sensor, the electrostatic pen including: a pen point electrode; a grounding section; a switch section having one terminal connected to the pen point electrode and having another terminal connected to the grounding section; and a control section configured to be able to transmit information to the electronic apparatus by controlling an on-off state of the switch section; the control section transmitting the information on a basis of a system that associates a direction of a transition of a transmission level, the transition of the transmission level being effected by turning on or off the switch section, with contents of the information.

According to an embodiment, the first diode passes a current in the first state, and the first diode does not pass the current in the second state. That is, the first diode functions as the switch. The stray capacitance of the diode is lower than that of MOS transistors and ordinary bipolar transistors. Hence, according to an embodiment, the accuracy of information detection in the position detecting device may be increased.

In an embodiment, because the reverse-current preventing unit that prevents a current from flowing from the first terminal part to the second terminal part is provided, the flow of the current from the first terminal part to the second terminal part is prevented particularly in the second state.

In an embodiment, the capacitance change in the diode due to the potential difference at an off time is smoother than when the MOS transistor is used as the switch. Thus, when the potential difference between the control signal and the inverted signal is controlled to a plurality of levels, a current flowing from the first terminal part to the third terminal part can be controlled to a plurality of levels. Hence, information can be transmitted using multilevel modulation.

In an embodiment, the control section is configured to be able to transmit information to the electronic apparatus, and the control section sets the switch section in an on state (sets the pen point electrode and the grounding section in a state of being electrically connected to each other) when not transmitting information to the electronic apparatus. Thus, even when the electrostatic pen of the type performing information transmission is provided with a period in which information transmission is not performed, the touch sensor can perform position detection without any problem. In an embodiment, the signal detected during the period during which the transmission is not performed can also be used as a signal in an idling time necessary to reliably detect a start bit indicating a start of transmission of information from the electrostatic pen. The touch sensor can therefore reliably detect the start position of a signal corresponding to information.

In an embodiment, the control section transmits information on the basis of the system that associates the direction of a transition of a signal level, the transition of the signal level being affected by turning on or off the switch section, with contents of the information. Thus, a time in which the position detecting device can detect the presence of the electrostatic pen can be mixed within a time of communication of information of one bit irrespective of the contents of the information. Therefore information communication can be performed while enabling position detection without depending on the contents of the information (deviation of binary values).

In an embodiment, an electrostatic pen comprises: a switch having: first, second and third terminals; and a first diode having an anode coupled to the first terminal and a cathode coupled to the third terminal; a pen point electrode coupled to the first terminal of the switch; and control circuitry, which, in operation: supplies respective potentials to the second terminal and the third terminal of the switch; and switches between two or more states including a first state in which a potential of the second terminal is higher than a potential of the third terminal and a second state in which the potential of the second terminal is equal to or lower than the potential of the third terminal. In an embodiment, the switch includes a reverse-current limiting circuit coupled between the first terminal and the second terminal, and, in operation, the reverse-current limiting circuit limits a current from flowing between the first terminal and the second terminal. In an embodiment, the reverse-current limiting circuit comprises a resistive element. In an embodiment, the reverse-current limiting circuit comprises a second diode having an anode coupled to the resistive element and having a cathode coupled to the first terminal. In an embodiment, the control circuitry, in operation, supplies a control signal to the second terminal. In an embodiment, the control signal is a binary signal, which, in operation, has a value of one of a high level and a low level. In an embodiment, the control circuitry, in operation, supplies an inverted signal of the control signal to the third terminal. In an embodiment, the control circuitry, in operation, controls a potential difference between the control signal and the inverted signal to have one of two or more levels. In an embodiment, the control circuitry, in operation, controls the potential difference between the control signal and the inverted signal to have one of two or more levels in a non-positive range of the first diode. In an embodiment, the third terminal is coupled to a ground. In an embodiment, the electrostatic pen comprises: a main body comprising a conductor, the main body supporting the pen point electrode via an insulator, wherein the third terminal is coupled to the conductor and the conductor, in operation, is grounded through user contact with the main body. In an embodiment, the first diode is a positive-intrinsic-negative diode. In an embodiment, the first diode is a positive-negative diode. In an embodiment, the pen point electrode, in operation, electrostatically couples to a capacitance type sensor; and the control circuitry, in operation, switches between the first state and the second state based on information to be transmitted from the electrostatic pen to the sensor. In an embodiment, the control circuitry, in operation, maintains the first state when information is not being transmitted to the sensor. In an embodiment, the control circuitry, in operation, controls transmission of the information by switching between the states, contents of the information being associated with a transition of a transmission level.

In an embodiment, an electrostatic pen comprises: a pen point electrode; grounding circuitry; a switch having a first terminal coupled to the pen point electrode and having a second terminal coupled to the grounding circuitry; and control circuitry, which, in operation, controls transmission of information to an electronic apparatus having a capacitive type sensor by controlling an on-off state of the switch; and electrically couples the pen point electrode to the grounding circuitry by setting the switch to an on state when information is not being transmitted to the electronic apparatus. In an embodiment, the control circuitry, in operation, holds the switch in an on state for a determined time before or after transmitting the information. In an embodiment, the control circuitry, in operation, controls a switching rate of the switch to generate an information signal of over 12 Hz. In an embodiment, the control circuitry, in operation, controls the switching rate of the switch at a frequency equal to or lower than half of a frequency corresponding to a scanning rate of the sensor. In an embodiment, the control circuitry, in operation, controls transmission of the information by turning the switch on and off to change transmission levels of the information signal, a direction of a transition of a transmission level being associated with contents of the information. In an embodiment, the switching rate is 24 Hz, and half of the frequency corresponding to the scanning rate of the sensor is 100 Hz. In an embodiment, the control circuitry, in operation, controls transmission of the information based on an association of a combination of the direction of the transition of the transmission level and a magnitude of the transition with the contents of the information. In an embodiment, the control circuitry, in operation, controls transmission of a determined start signal before starting transmission of the information, and controls transmission of a determined stop signal after ending the transmission of the information.

In an embodiment, an electrostatic pen comprises: a pen point electrode; grounding circuitry; a switch having a first terminal coupled to the pen point electrode and having a second terminal coupled to the grounding circuitry; and control circuitry, which, in operation, controls transmission of information to an electronic apparatus including a capacitive type sensor by controlling an on-off state of the switch to cause transitions of a transmission level, wherein a direction of a transition of the transmission level is associated with contents of the information.

In an embodiment, a system comprises: a capacitive sensor; and an electrostatic pen including: a switch having: first, second and third terminals; and a first diode having an anode coupled to the first terminal and a cathode coupled to the third terminal; a pen point electrode coupled to the first terminal of the switch; and control circuitry, which, in operation: supplies respective potentials to the second terminal and the third terminal of the switch; and switches between two or more states including a first state in which a potential of the second terminal is higher than a potential of the third terminal and a second state in which the potential of the second terminal is equal to or lower than the potential of the third terminal. In an embodiment, the switch includes a reverse-current limiting circuit coupled between the first terminal and the second terminal, and, in operation, the reverse-current limiting circuit limits a current from flowing between the first terminal and the second terminal. In an embodiment, the pen point electrode, in operation, electrostatically couples to the capacitance type sensor; and the control circuitry, in operation, switches between the two or more states based on information to be transmitted from the electrostatic pen to the capacitive sensor.

DETAILED DESCRIPTION

Example embodiments will hereinafter be described in detail with reference to the accompanying drawings. In the present specification, three embodiments are cited to describe touch type input systems according to embodiments. Description will first be made of parts common to the three embodiments, and thereafter description will be made of each of the three embodiments.

Figure 1:
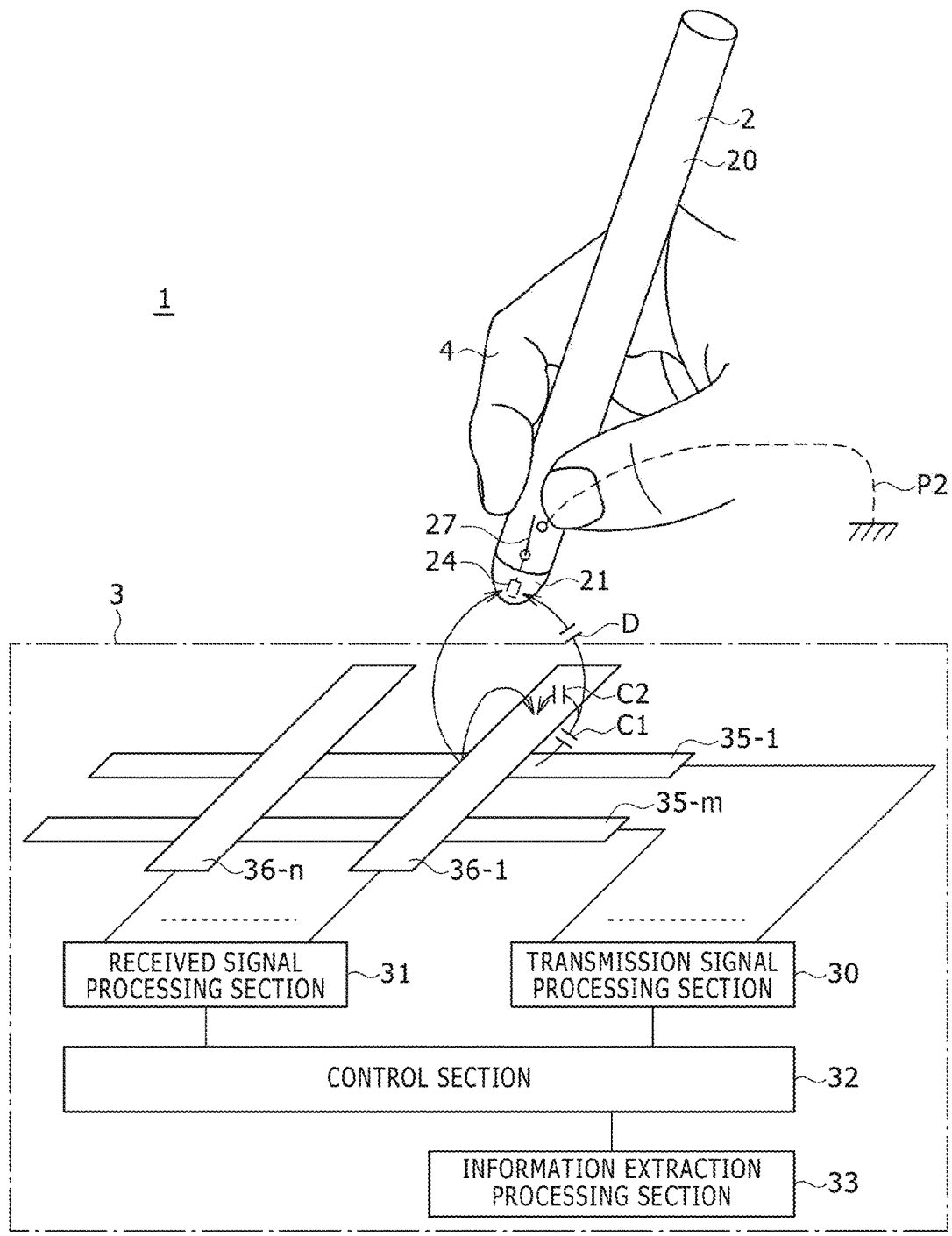
FIG. 1 is a diagram showing a system configuration of a touch type input system according to an embodiment.

First, with regard to the parts common to the three embodiments, as shown in FIG. 1, a touch type input system 1 according to an embodiment includes an electrostatic pen 2 and a touch sensor 3.

The electrostatic pen 2 is an indicator for a human to indicate a position on the touch sensor 3. The electrostatic pen 2 includes: a main body 20 (grounding section) formed of a cylindrical conductor; a pen point tip 21, which is an insulator or a dielectric; a pen point electrode 24 housed within the pen point tip 21; and a switch section 27 to control a conduction state between the pen point electrode 24 and the main body 20. The electrostatic pen 2 is generally used in a state in which a hand 4 illustrated in FIG. 1 holds the main body 20. Therefore the main body 20 is usually grounded through a human body, as shown in FIG. 1.

The touch sensor 3 is for example a position detecting device (electronic apparatus) having a flat sensor, such as a digitizer, a tablet PC (personal computer), or the like. The touch sensor 3 is configured to detect a position indicated by the electrostatic pen 2 on the sensor by a cross-point type mutual capacitance system as a kind of projective type capacitance system. Specifically, the sensor of the touch sensor 3 has a configuration formed by arranging m X-direction electrodes 35 (X-direction electrodes 35-1 to 35-m) each extending in an X-direction at equal intervals and n Y-direction electrodes 36 (Y-direction electrodes 36-1 to 36-n) each extending in a Y-direction (direction orthogonal to the X-direction within the surface of the sensor) at equal intervals.

As shown in FIG. 1, the touch sensor 3 includes, in addition to the sensor, circuitry including a transmission signal processing section 30, a received signal processing section 31, a control section 32, and an information extraction processing section 33.

The transmission signal processing section 30 has a function of sequentially outputting a determined alternating-current signal to the m X-direction electrodes 35. Timing in which the transmission signal processing section 30 outputs the signal is controlled by the control section 32. The alternating-current signal supplied to an X-direction electrode 35 by the transmission signal processing section 30 is supplied to each Y-direction electrode 36 through a capacitance occurring between the X-direction electrode 35 and each Y-direction electrode 36 vertically opposed to the X-direction electrode 35. The received signal processing section 31 has an analog-to-digital converter to receive the alternating-current signal that has thus arrived at each Y-direction electrode 36. The received signal processing section 31 digitizes the value (level) of the received signal from each Y-direction electrode 36 by the analog-to-digital converter, and outputs the signal value to the control section 32. The control section 32 detects the position of the electrostatic pen 2 on the touch sensor 3 from the thus supplied signal value and supplies the supplied signal value to the information extraction processing section 33. The information extraction processing section 33 has a function of receiving information transmitted by the electrostatic pen 2 on the basis of the signal value supplied from the control section 32.

Description will be made of detection of the position of the electrostatic pen 2. First, at a point of intersection of an X-direction electrode 35-$k$ ($k$ is an integer of 1 to m) and a Y-direction electrode 36-$j$ ($j$ is an integer of 1 to n) (see, e.g., FIGS. 7A, 7B, 9A, 9B, 11A and 11B), for example, there is a capacitance obtained by combining capacitances C1 and C2 shown in FIG. 1 with each other when the pen point tip 21 of the electrostatic pen 2 is not present. In this case, when the pen point tip 21 of the electrostatic pen 2 approaches this point of intersection, a capacitance D shown in FIG. 1 is generated. The capacitance D guides part of a current that would be supplied through the capacitance obtained by combining the capacitances C1 and C2 with each other when the pen point tip 21 is not present. When the pen point tip 21 of the electrostatic pen 2 approaches and thus the capacitance D becomes large with respect to the capacitance C2, part of the current sent out from the X-direction electrode 35-$k$ flows out to a grounding terminal through a current path P2 formed in the electrostatic pen 2 and the hand 4 (in a case where the switch section 27 is on (a case where the switch section 27 is off will be described later)). As a result, the current detected by the received signal processing section 31 in relation to the Y-direction electrode 36-$j$ is decreased. Thus, the signal value supplied from the received signal processing section 31 to the control section 32 in relation to the Y-direction electrode 36-$j$ is decreased. The control section 32 detects that the pen point tip 21 of the electrostatic pen 2 is in proximity to the point of intersection of the X-direction electrode 35-$k$ and the Y-direction electrode 36-$j$ on the basis of such a change in the signal value.

Description will next be made of reception of information transmitted by the electrostatic pen 2. As will be described later in detail, the electrostatic pen 2 controls the on-off state of the switch section 27 according to the information to be transmitted. When the switch section 27 is in an on state, the pen point electrode 24 and the hand 4 are electrically connected to each other, so that the above-described current path P2 is formed between the pen point electrode 24 and the grounding terminal. Hence, in this case, when the pen point tip 21 of the electrostatic pen 2 approaches the point of intersection of the X-direction electrode 35 and the Y-direction electrode 36, the signal value supplied from the received signal processing section 31 to the control section 32 in relation to the point of intersection is decreased, as described above. When the switch section 27 is in an off state, on the other hand, the pen point electrode 24 is electrically disconnected from the grounding terminal, and is thus set in a floating state, so that the above-described current path P2 is not formed. Hence, in this case, even when the pen point tip 21 of the electrostatic pen 2 approaches the point of intersection of the X-direction electrode 35 and the Y-direction electrode 36, the signal value supplied from the received signal processing section 31 to the control section 32 in relation to the point of intersection is not decreased as described above.

In this case, the on-off control of the switch section 27 by the electrostatic pen 2 is performed using a frequency at which the signal detected on the side of the position detecting device can be identified as not being a signal resulting from a human operating the electrostatic pen 2. For example, the switch section 27 is subjected to on-off control at a rate such that the communicated signal has a frequency over 12 Hz.

Here, the numerical value exceeding 12 Hz is a value determined on the basis of a knowledge that even when a human operates the electrostatic pen 2 upward and downward (in a vertical direction) with respect to the sensor at high speed, the number of times that the electrostatic pen 2 is detected on the position detecting device side does not exceed 12 per second. Incidentally, when information is encoded by a Manchester code and then transmitted, as will be described later, depending on a row of 0s and 1s, the frequency of the signal may be half the on-off frequency of the switch. Thus, the switch is turned on and off at a rate exceeding 24 Hz.

Hence, when changes in signal value as described above are construed as a binary signal constituted of two values, that is, a large signal value and a small signal value, the information transmitted by the electrostatic pen 2 is superimposed on a frequency component exceeding 12 Hz in the binary signal. The information extraction processing section 33 accordingly extracts the frequency component exceeding 12 Hz from the signal represented by the changes in the signal value supplied from the control section 32, and demodulates the information transmitted by the electrostatic pen 2 on the basis of the extracted frequency component.

In an embodiment, the rate of on-off control of the switch section 27 by the electrostatic pen 2 is set to a frequency equal to or lower than half a frequency corresponding to the scanning rate of the touch sensor 3. For example, when the touch sensor 3 in which the scanning rate of the sensor is 200 Hz is used, the frequency of on-off control of the switch section 27 by the electrostatic pen 2 may be 100 Hz or lower. This controls the frequency of the signal to 100 Hz or lower even in the case of any row of binary values. Thus, the reception of the information in the touch sensor 3 can be performed with the scanning rate of 200 Hz set as a sampling frequency.

Figure 2:
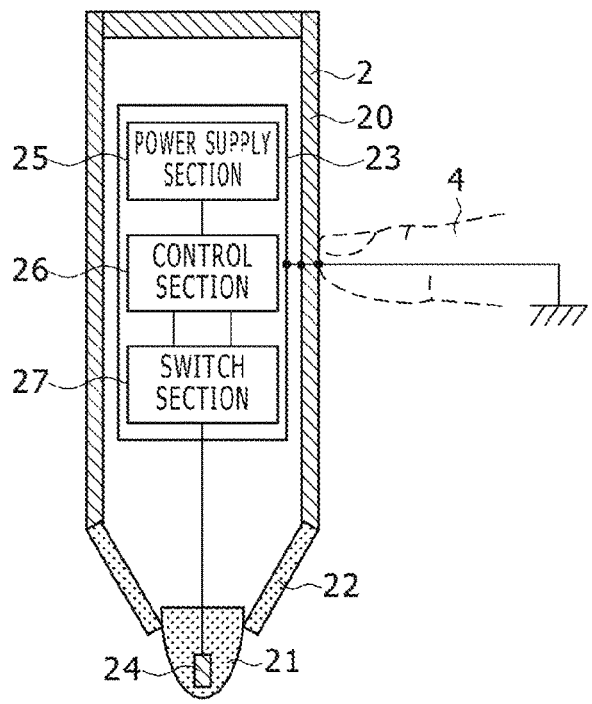
FIG. 2 is a sectional view showing an example internal configuration of an electrostatic pen shown in FIG. 1.

A configuration of the electrostatic pen 2 will be described in more detail with reference to FIG. 2 and FIG. 3. As shown in FIG. 2, the electrostatic pen 2 includes, in addition to the main body 20, the pen point tip 21, and the pen point electrode 24 described above, an insulating section 22 and a substrate 23. Various kinds of circuits are formed on the substrate 23. The circuits comprise a power supply section 25, a control section 26, and the switch section 27.

The main body 20 comprises a conductor, as described above. On the other hand, the pen point tip 21 and the insulating section 22 comprise an insulator. The main body 20 supports the pen point electrode 24 via these insulators. The main body 20 and the pen point electrode 24 are therefore insulated from each other. In addition, the substrate 23 is electrically coupled to the main body 20, and is grounded through the main body 20 and a human body (hand 4) touching the main body 20.

The power supply section 25 is a power supply to supply power necessary for the operation of the control section 26 and the switch section 27. Specifically, a battery is for example suitably used as the power supply section 25.

The control section 26 is a functional unit that generates information to be transmitted to the touch sensor 3, and which controls the switch section 27 on the basis of the generated information. As shown in FIG. 3, the control section 26 includes a transmission data generating circuit 26a, a transmission control circuit 26b, and a switch control signal output circuit 26c.

The transmission data generating circuit 26a obtains information to be transmitted to the touch sensor 3, and assembles transmission information on the basis of the obtained information. The information obtained by the transmission data generating circuit 26a can include information indicating a pen pressure detected by a pen pressure detecting mechanism (not shown) within the electrostatic pen 2, information indicating the on-off state of a side switch (not shown) provided to the side surface of the electrostatic pen 2, and the like. However, the information obtained by the transmission data generating circuit 26a is not limited to these pieces of information.

The transmission control circuit 26b performs on-off control of the switch section 27 on the basis of the transmission information generated by the transmission data generating circuit 26a. Specifically, the transmission control circuit 26b determines a transmission level on the basis of the transmission information, and sends out data indicating the determined transmission level to the switch control signal output circuit 26c.

Figure 4A:
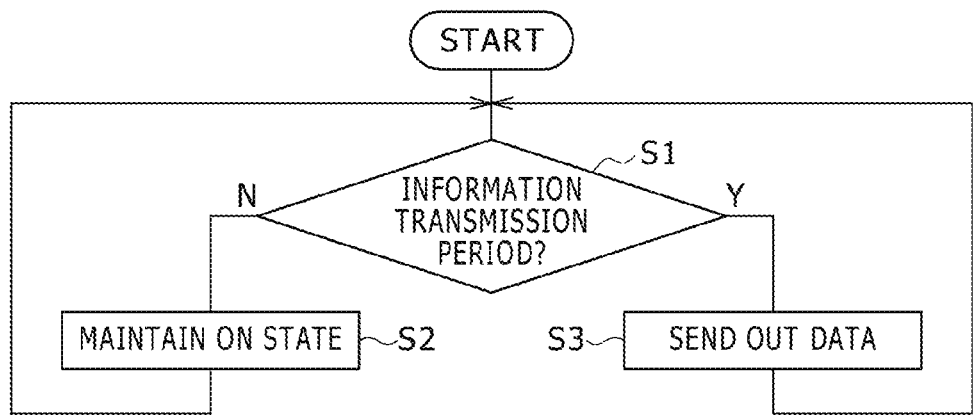
FIG. 4A is a flowchart showing an example operation of a transmission control circuit shown in FIG. 3.
Figure 4B:
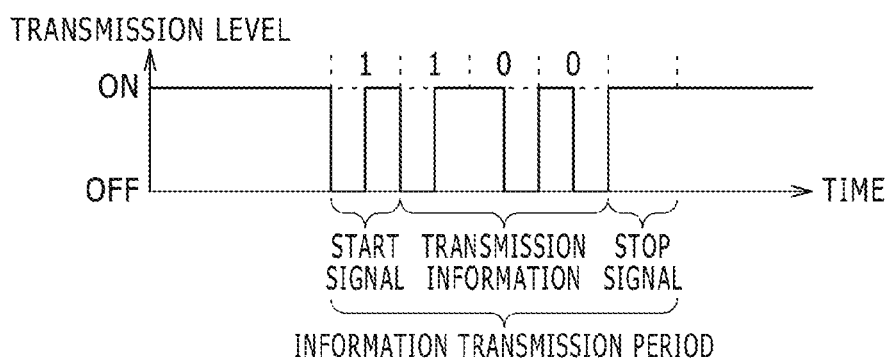
FIG. 4B is a diagram showing an example of a signal in a case where binary modulation is used.

Examples of the control of the transmission level by the transmission control circuit 26b will be described in detail with reference to FIGS. 4A and 4B. As shown in FIG. 4A, the transmission control circuit 26b first determines whether or not an information transmission period has arrived (step S1). When determining that the information transmission period has not arrived, the transmission control circuit 26b sets the transmission level to an "ON" state, as shown in FIG. 4B. The switch section 27 is thereby maintained in the on state (step S2). Therefore a state in which the pen point electrode 24 and the main body 20 are electrically connected to each other is maintained. The touch sensor 3 according to the present embodiment can thus detect the position of the electrostatic pen 2 without any problem even outside the information transmission period.

When determining that the information transmission period has arrived in step S1, on the other hand, the transmission control circuit 26b controls the transmission level on the basis of the transmission information generated by the transmission data generating circuit 26a (step S3). More specifically, the transmission control circuit 26b first controls the transmission level so as to indicate a determined start signal, and next controls the transmission level on the basis of the transmission information in bit units. After ending the control for all of bits constituting the transmission information, the transmission control circuit 26b controls the transmission level so as to indicate a determined stop signal.

The control of the transmission level on the basis of the transmission information in bit units may be performed specifically by a system that associates transitions of the transmission level with the contents of the information, that is, a so-called Manchester system. In the present embodiment, the transmission control circuit 26b associates only directions of transitions of the transmission level with the contents of the information. More specifically, as shown in FIG. 4B, a fall in the transmission level (transition from "ON" to "OFF") is associated with transmission information "0," and a rise in the transmission level (transition from "OFF" to "ON") is associated with transmission information "1." An opposite association may also be employed, of course.

As shown in FIG. 4B, the start signal and the stop signal are both transmitted using a transmission time for one chip of the Manchester code. In the present embodiment, the transmission control circuit 26b controls the transmission level in a similar manner to the transmission information "1" for the start signal, and controls the transmission level so as to fix the transmission level to "ON" for the stop signal.

Figure 5A:
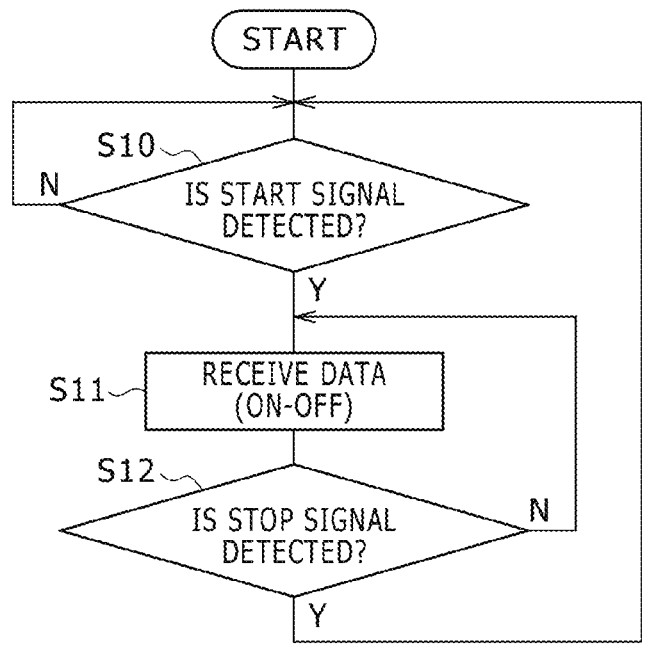
FIGS. 5A and 5B are flowcharts showing example operations of an information extraction processing section shown in FIG. 1, FIG. 5A illustrating a case where binary modulation is used, and FIG. 5B illustrating a case where multilevel modulation is used.

An example of the processing of received signals in the information extraction processing section 33 shown in FIG. 1 will be described in the following with reference to FIG. 5A. As described above, the information extraction processing section 33 is sequentially supplied with signal values of received signals from the control section 32. The information extraction processing section 33 monitors the series of signal values thus supplied, and detects the above-described start signal (step S10). Specifically, when the transmission level of the signal values rises by a determined level or more after being at a certain level for a determined time, it is determined that the start signal is detected.

After detecting the start signal, the information extraction processing section 33 next receives data (step S11). In the present embodiment, as described above, transmission is made by the Manchester system. The information extraction processing section 33 accordingly detects variations (rise or fall) in the transmission level by sequentially making binary threshold value determination for the series of signal values supplied from the control section 32. The information extraction processing section 33 thereby receives data transmitted by the electrostatic pen 2 (transmission information generated by the transmission data generating circuit 26a).

The information extraction processing section 33 repeats detection of the above-described stop signal while receiving the data (step S12). Specifically, when a determined time has passed with the transmission level of the series of signal values supplied from the control section 32 remaining in the "ON" state, it is determined that the stop signal is detected. When the stop signal is detected, the information extraction processing section 33 determines that the information transmission period is ended. The information extraction processing section 33 then returns to step S10 to start the operation of detecting the start signal. Incidentally, it is not essential to use such a stop signal in communication between the electrostatic pen 2 and the touch sensor 3. However, the use of the stop signal facilitates making the information extraction processing section 33 recognize an end of the information transmission period even when the bit length of the information transmission period is not fixed. Hence, information having an arbitrary amount of information can be transmitted from the electrostatic pen 2 to the touch sensor 3.

Thus, the signal (information) detected during the period during which information transmission is not made, which signal (information) is maintained in an "ON" state, can be not only used for position detection by the position detecting device but also used as a signal in an idling time necessary to detect the start bit indicating a start of transmission of information from the electrostatic pen and the stop bit.

Figure 3:
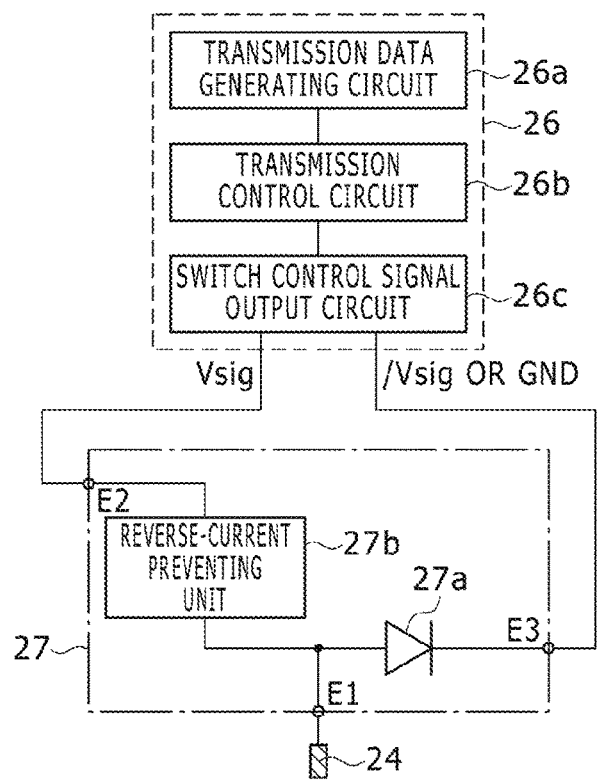
FIG. 3 is a diagram showing an internal configuration of an example control section and an example switch section shown in FIG. 2.

The description returns to FIG. 3. The switch control signal output circuit 26c outputs a signal for performing on-off control of the switch section 27 on the basis of the data supplied from the transmission control circuit 26b. Specifically, the switch control signal output circuit 26c generates a control signal Vsig that is set to a high level in correspondence with a transmission level "ON" and which is set to a low level in correspondence with a transmission level "OFF," and supplies the control signal Vsig to the switch section 27. The switch control signal output circuit 26c also has a function of supplying the switch section 27 with an inverted signal/Vsig of the control signal Vsig or a ground potential GND (low-level potential). Incidentally, in a first embodiment (FIG. 6 and FIGS. 7A and 7B) and a second embodiment (FIG. 8 and FIGS. 9A and 9B) to be described later, description will be made of an example in which the control signal Vsig and the ground potential GND are supplied from the switch control signal output circuit 26c to the switch section 27. In a third embodiment (FIG. 10 and FIGS. 11A and 11B) to be described later, on the other hand, description will be made of an example in which the control signal Vsig and the inverted signal/Vsig are supplied from the switch control signal output circuit 26c to the switch section 27.

As shown in FIG. 3, the switch section 27 includes: a first terminal part E1 coupled to the pen point electrode 24; a second terminal part E2 supplied with the control signal Vsig from the switch control signal output circuit 26c; a third terminal part E3 supplied with the inverted signal/Vsig or the ground potential GND from the switch control signal output circuit 26c; a first diode 27a having an anode coupled to the first terminal part E1 and having a cathode coupled to the third terminal part E3; and a reverse-current preventing or limiting circuit/unit 27b coupled between the first terminal part E1 and the second terminal part E2.

When the control signal Vsig supplied from the switch control signal output circuit 26c is at a high level, the switch section 27 assumes a state (first state) in which the potential of the second terminal part E2 is higher than the potential of the third terminal part E3. In this case, the first diode 27a is in an on state, so that a current can be made to flow from the first terminal part E1 to the third terminal part E3. That is, the switch section 27 is in an on state, and the current path P2 shown in FIG. 1 is formed. When the control signal Vsig supplied from the switch control signal output circuit 26c is at a low level, on the other hand, the switch section 27 assumes a state (second state) in which the potential of the second terminal part E2 is equal to or lower than the potential of the third terminal part E3. In this case, the first diode 27a is in an off state, so that no current flows from the first terminal part E1 to the third terminal part E3. That is, the switch section 27 is in an off state, and the current path P2 shown in FIG. 1 is blocked.

The electrostatic pen 2 thus controls the on-off state of the switch section 27 by the potential level of the control signal Vsig supplied to the switch section 27 by the switch control signal output circuit 26c. It is the first diode 27a, and not a switching element such as a MOS transistor, a bipolar transistor, or the like, that functions as an entity of a switch within the switch section 27. A diode has a lower stray capacitance than a MOS transistor or an ordinary bipolar transistor. The first diode 27a can therefore block the current path P2 more reliably after the control signal Vsig is changed from a high level to a low level. Hence, the electrostatic pen 2 can increase the accuracy of information detection in the touch sensor 3.

Incidentally, while a PN (positive-negative) diode, which is a most basic diode, can be used as the first diode 27a, in an embodiment a PIN (p-intrinsic-n) diode, which comprises a semiconductor layer having a high electric resistance interposed between a P-region and an N-region, may be used. The PIN diode has a characteristic of a low capacitance between terminals (junction capacitance between the P-region and the N-region) because the PIN diode has the semiconductor layer having a high electric resistance between the P-region and the N-region. Due to this characteristic, the PIN diode has a stray capacitance even lower than the PN diode. To cite concrete numerical values, in a PIN diode the stray capacitance in a state in which a potential difference between the P-region and the N-region is zero is typically about 0.5 pF, and the stray capacitance is typically about 0.8 pF at a maximum. Hence, the use of a PIN diode as the first diode 27*a* facilitates realizing a low stray capacitance of 1 pF or less. Thus, a current flowing in from the first terminal part E1 can be blocked even more reliably after the control signal Vsig is changed from a high level to a low level. The accuracy of information detection in the touch sensor 3 can therefore be further increased.

The reverse-current preventing unit 27*b* prevents a current from flowing from the first terminal part E1 to the second terminal part E2 particularly when the second terminal part E2 has a low potential level. For example, a resistive element or a diode can be used as the reverse-current preventing unit 27*b*. This will be separately described in detail in the first to third embodiments to be described later.

The above description has been made of the parts common to the three embodiments in the touch type input system 1 according to the present embodiment. Next, the three embodiments will each be described sequentially. Differences in the three embodiments are differences in configuration of the switch control signal output circuit 26*c* and the switch section 27. Thus, description in the following will be made directing attention to these differences.

Figure 6:
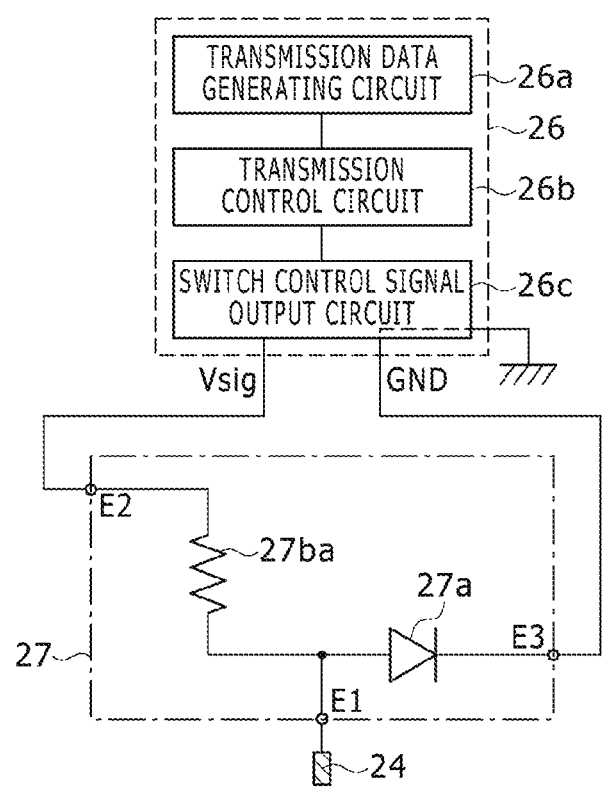
FIG. 6 is a diagram showing the switch section of an electrostatic pen according to a first embodiment.

As shown in FIG. 6, the switch section 27 according to the first embodiment includes a resistive element 27*ba* as the reverse-current preventing unit 27*b*. In addition, the third terminal part E3 is supplied with the ground potential GND from the switch control signal output circuit 26*c*. Incidentally, the ground potential GND supplied to the switch control signal output circuit 26*c* is supplied to the substrate 23 through the main body 20 and the hand 4 (see FIG. 2).

The resistive element 27*ba* has a role of suppressing a current (reverse-current) flowing from the first terminal part E1 to the second terminal part E2. The resistance value of the resistive element 27*ba* therefore needs to be large enough to be able to suppress the current sufficiently. On the other hand, the resistance value of the resistive element 27*ba* cannot be made too large because too large a resistance value of the resistive element 27*ba* slows on-off switching response of the switch section 27. To cite concrete numerical values, in the present embodiment, the resistive element 27*ba* may need to have 100 kΩ or more to prevent the reverse-current, and the resistive element 27*ba* may need to have 10 MΩ or less in consideration of the switching response. Hence, in the present embodiment, the resistance value of the resistive element 27*ba* may be 100 kΩ to 10 MΩ, and in an embodiment may be set to about 3 MΩ.

Operation of the switch section 27 according to the present embodiment will be described with reference to FIGS. 7A and 7B. Incidentally, the following description supposes that a determined signal is transmitted from the transmission signal processing section 30 to the received signal processing section 31 within the touch sensor 3 shown in FIG. 1 through a current path P1 shown in FIGS. 7A and 7B (path from the transmission signal processing section 30 through the X-direction electrode 35-*k* and the Y-direction electrode 36-*j* to the received signal processing section 31), and supposes that the pen point electrode 24 of the electrostatic pen 2 held by a person is in proximity to the point of intersection of the X-direction electrode 35-*k* and the Y-direction electrode 36-*j*.

Figure 7A:
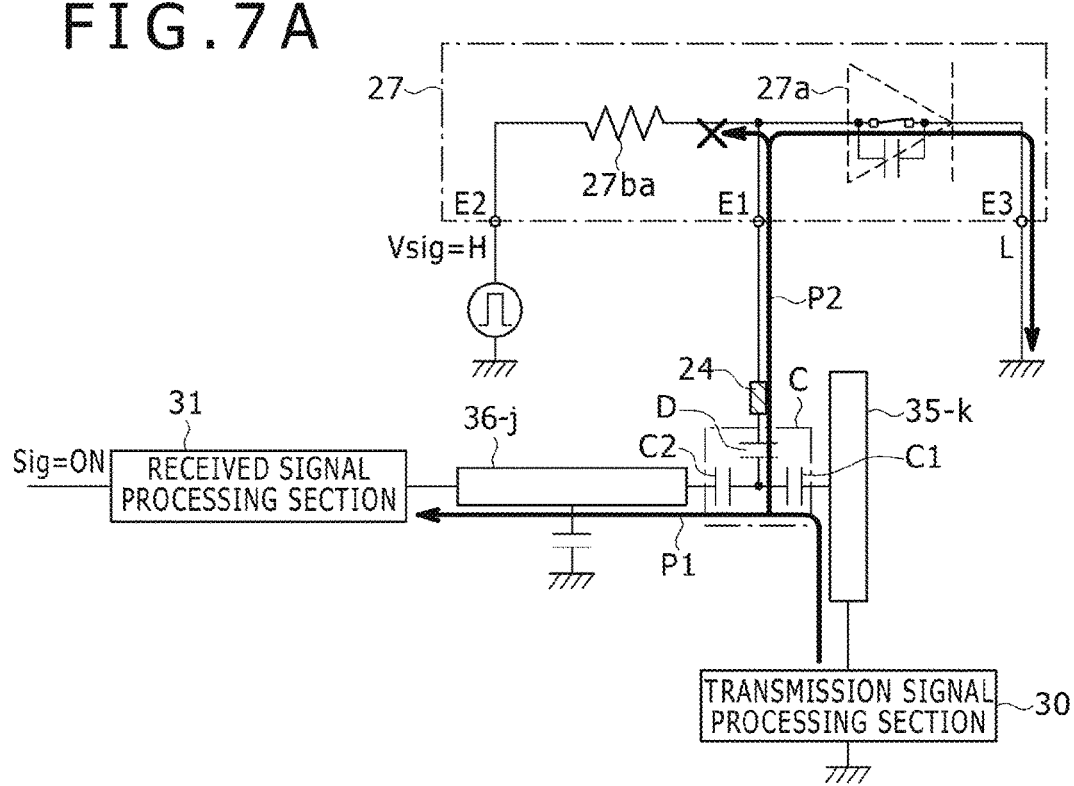
FIGS. 7A and 7B are diagrams showing example operating principles of the electrostatic pen shown in FIG. 6, FIG. 7A illustrating transmission of a high level, and FIG. 7B illustrating transmission of a low level.

When the control signal Vsig is at a high level, the first diode 27*a* is in an on state, as shown in FIG. 7A. As a result, the current path P2 is formed between the pen point electrode 24 and the grounding terminal. The current path P2 is coupled to the current path P1 via the capacitance D formed between the pen point electrode 24 and the sensor surface of the touch sensor 3. Part of the current flowing from the transmission signal processing section 30 to the received signal processing section 31 therefore flows out to the grounding terminal via the current path P2. Consequently, the signal value detected by the analog-to-digital converter within the received signal processing section 31 is relatively decreased, and the information extraction processing section 33 shown in FIG. 1 obtains a value "ON" of a received signal Sig from this decrease.

Figure 7B:
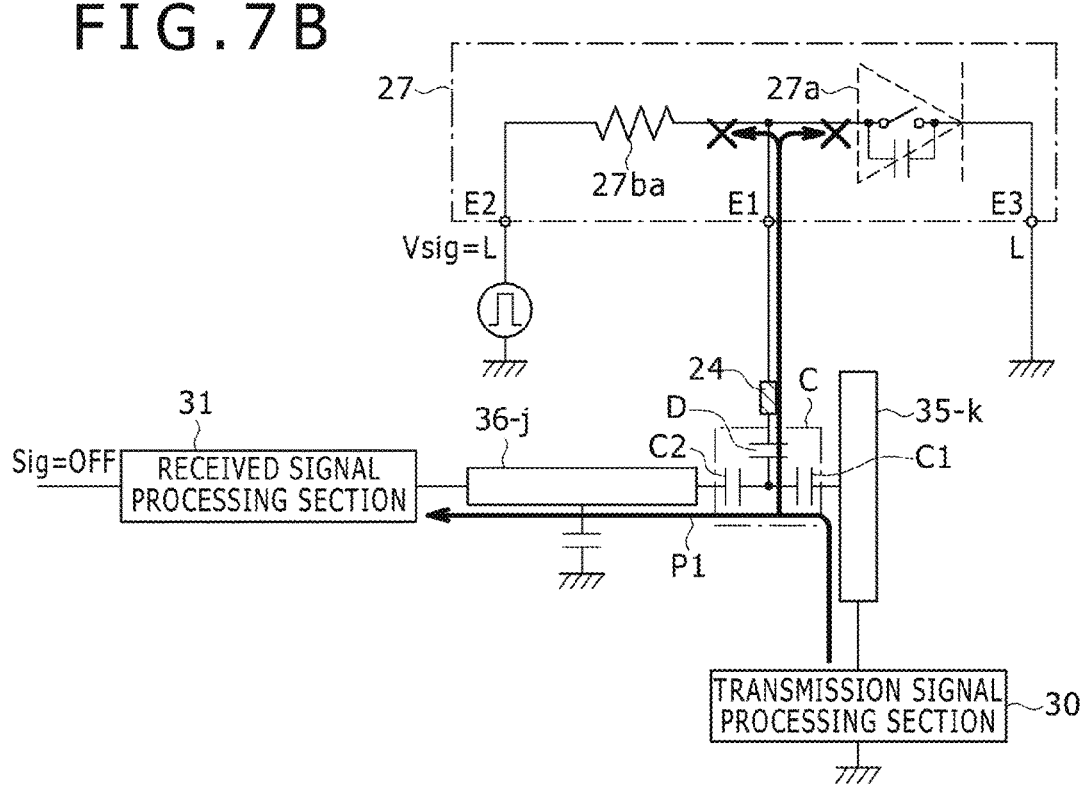

When the control signal Vsig is at a low level, alternatively, the first diode 27*a* is in an off state, as shown in FIG. 7B. As a result, the current path P2 from the first terminal part E1 to the third terminal part E3 as in the case of FIG. 7A is not formed. Therefore all of the current flowing from the transmission signal processing section 30 to the received signal processing section 31 flows into the received signal processing section 31. Consequently, the signal value detected by the analog-to-digital converter within the received signal processing section 31 is relatively increased, and the information extraction processing section 33 shown in FIG. 1 obtains a value "OFF" of the received signal Sig from this increase.

Here, consideration will be given to the current path P2 from the first terminal part E1 to the second terminal part E2. If a current flows through this current path P2, the current flowing into the received signal processing section 31 is correspondingly decreased. However, in the present embodiment, the resistive element 27*ba* having a large resistance value is provided between the first terminal part E1 and the second terminal part E2. A current therefore hardly flows through the path branching in a direction from the first terminal part E1 to the second terminal part E2. Hence, when the first diode 27*a* is set in an off state, it is possible to prevent the current flowing into the received signal processing section 31 from being decreased and thus prevent the value of Sig from being erroneously detected as the value "ON."

As described above, according to the input system 1 according to the present embodiment, the switch control signal output circuit 26*c* controls the potential level of the control signal Vsig according to transmission information, whereby the information extraction processing section 33 can be made to receive the transmission information. Then, the first diode 27*a*, which is a diode having a low stray capacitance, functions as the entity of a switch within the switch section 27. Thus, the current path P2 can be blocked reliably after the control signal Vsig is changed from a high level to a low level. Hence, the accuracy of information detection in the touch sensor 3 can be increased.

In addition, the resistive element 27*ba* is provided as the reverse-current preventing unit 27*b*. Thus, particularly when the control signal Vsig is at a low level, it is possible to prevent a current from flowing from the first terminal part E1 to the second terminal part E2 (flowing backward).

Figure 8:
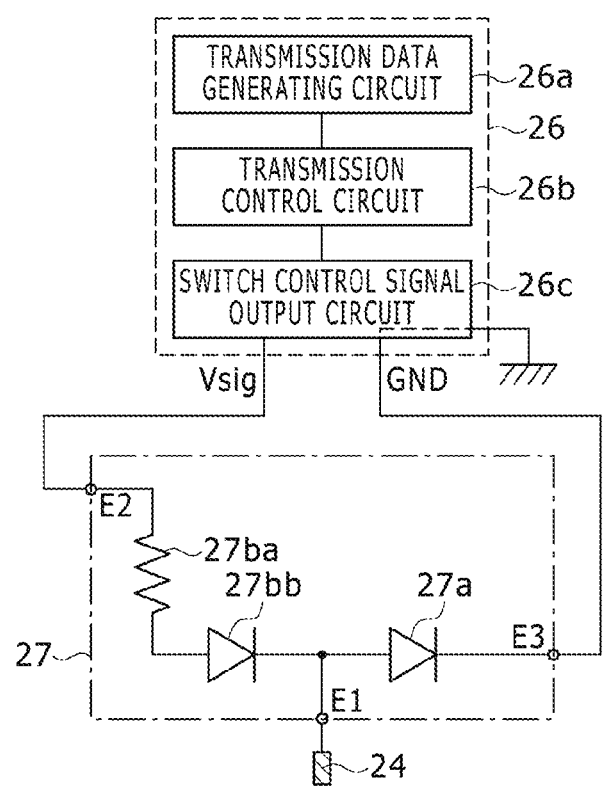
FIG. 8 is a diagram showing the switch section of an electrostatic pen according to a second embodiment.

Next, as shown in FIG. 8, an input system 1 according to the second embodiment is different from the input system 1 according to the first embodiment in that the reverse-current preventing unit 27*b* is formed by a resistive element 27*ba* and a second diode 27*bb* connected in series with each other. The input system 1 according to the second embodiment is otherwise similar to the input system 1 according to the first embodiment. The present embodiment facilitates realizing, with the addition of the second diode 27*bb*, a reduction in the resistance value of the resistive element 27*ba* as compared with the first embodiment, and thereby facilitates realizing an increase in speed of on-off switching response of the switch section 27. Description in the following will be made directing attention to differences from the input system 1 according to the first embodiment.

The resistive element 27ba and the second diode 27bb are coupled in series with each other between the second terminal part E2 and the first terminal part E1 in this order. That is, one terminal of the resistive element 27ba is coupled to the second terminal part E2. Another terminal of the resistive element 27ba and an anode of the second diode 27bb are coupled to each other. A cathode of the second diode 27bb is coupled to the first terminal part E1.

As described in the first embodiment, the resistance value of the resistive element 27ba needs to be large enough to be able to suppress a current sufficiently, whereas too large a resistance value of the resistive element 27ba slows the on-off switching response of the switch section 27. That is, the speed of the switching response and the reverse-current preventing effect are in a trade-off relation. According to the present embodiment, the second diode 27bb whose cathode is coupled to the first terminal part E1 is provided in series with the resistive element 27ba. Thus, on condition that the second diode 27bb be off, the second diode 27bb plays a role of preventing a current from flowing from the first terminal part E1 to the second terminal part E2. Hence, even when the resistive element 27ba has a small resistance value, a sufficient reverse-current preventing effect can be obtained, so that an increase in speed of the switching response can be achieved.

Operation of the switch section 27 according to the present embodiment will be described with reference to FIGS. 9A and 9B. A presupposition in FIGS. 9A and 9B is similar to that of FIGS. 7A and 7B.

Figure 9A:
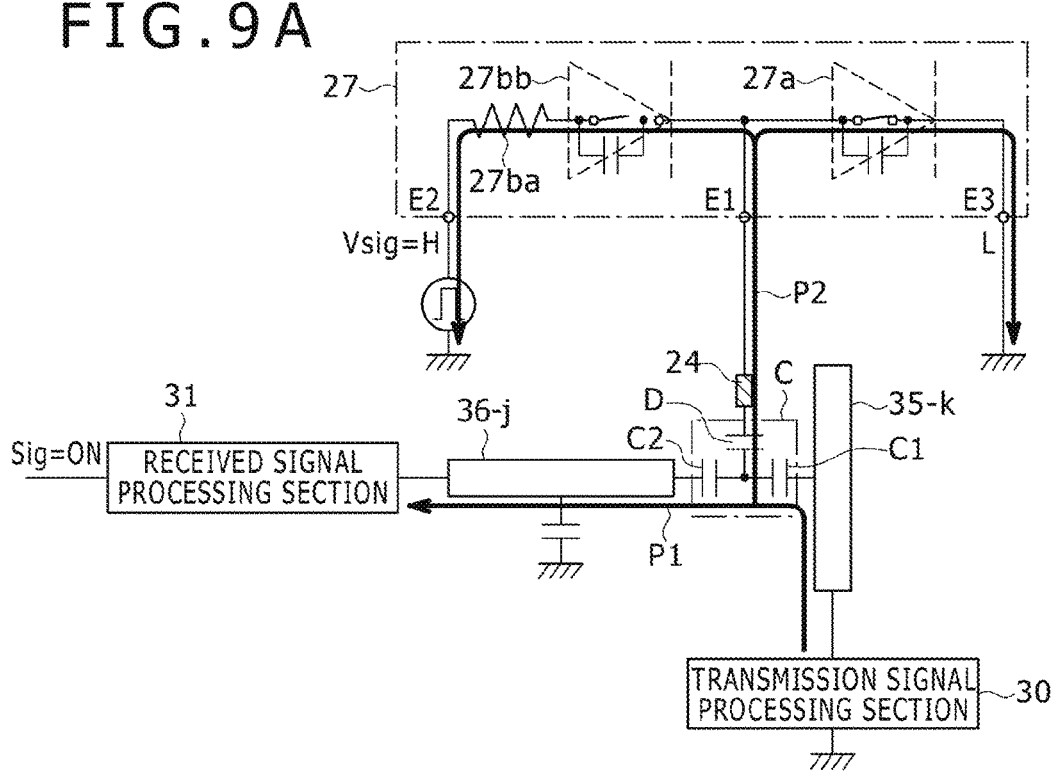
FIGS. 9A and 9B are diagrams showing example operating principles of the electrostatic pen shown in FIG. 8, FIG. 9A illustrating transmission of a high level, and FIG. 9B illustrating transmission of a low level.

When the control signal Vsig is at a high level, as shown in FIG. 9A, the first diode 27a and the second diode 27bb are both in an on state. As a result, the current path P2 is formed between the pen point electrode 24 and the grounding terminal. The effect produced by the formation of the current path P2 is similar to that of the first embodiment described with reference to FIGS. 7A and 7B. Incidentally, in this case, the second diode 27bb is on. Thus, as shown in FIG. 9A, a current also flows from the first terminal part E1 to the second terminal part E2. However, even when this current flows, the signal value detected by the analog-to-digital converter within the received signal processing section 31 is decreased all the same.

Figure 9B:
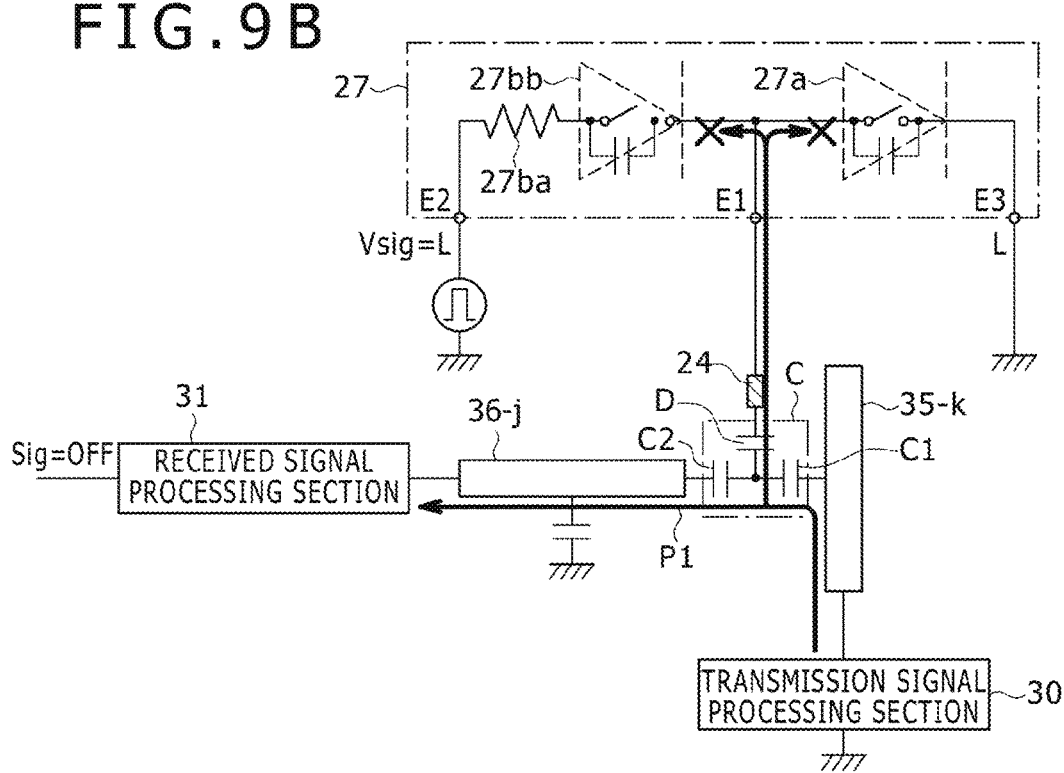

When the control signal Vsig is at a low level, on the other hand, as shown in FIG. 9B, the first diode 27a and the second diode 27bb are both in an off state. As a result, the current path P2 as in the case of FIG. 9A is not formed, of course, and the current path connecting the first terminal part E1 and the second terminal part E2 to each other is not formed either. This prevents part of the current flowing into the received signal processing section 31 from flowing (leaking) into the electrostatic pen 2. The information extraction processing section 33 shown in FIG. 1 can therefore obtain the value "OFF" of the received signal Sig more reliably.

As described above, according to the input system 1 according to the present embodiment, in addition to effects similar to those of the first embodiment, it is possible to obtain a further effect of more reliably preventing a current from flowing from the first terminal part E1 to the second terminal part E2 (flowing backward) when the control signal Vsig is at a low level. In addition, because the second diode 27bb is provided, the resistance value of the resistive element 27ba can be reduced (for example set to 1 kΩ to 100 kΩ). Thus, the on-off switching response of the switch section 27 can be increased in speed as compared with the first embodiment.

Incidentally, as in the case of the first diode 27a, while a PN diode, which is a most basic diode, can be used as the second diode 27bb, a PIN diode described above in an embodiment is used as the second diode 27bb. This can more reliably block the current flowing in from the first terminal part E1 to the electrostatic pen 2 after the control signal Vsig is changed from a high level to a low level.

Figure 10:
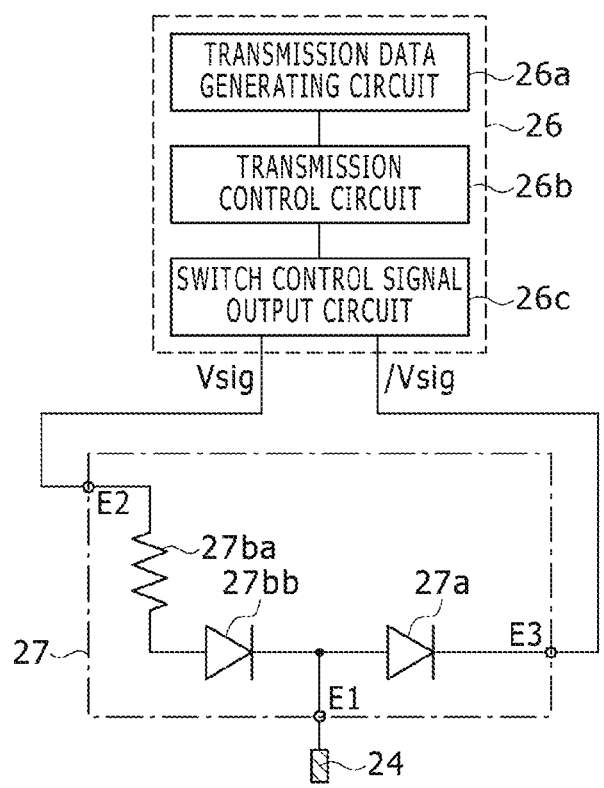
FIG. 10 is a diagram showing the switch section of an electrostatic pen according to a third embodiment.

Next, as shown in FIG. 10, an input system 1 according to the third embodiment is different from the input system 1 according to the second embodiment in that the inverted signal/Vsig of the control signal Vsig is supplied from the switch control signal output circuit 26c to the third terminal part E3. The input system 1 according to the third embodiment is otherwise similar to the input system 1 according to the second embodiment. Description in the following will be made directing attention to differences from the input system 1 according to the second embodiment.

Figure 11A:
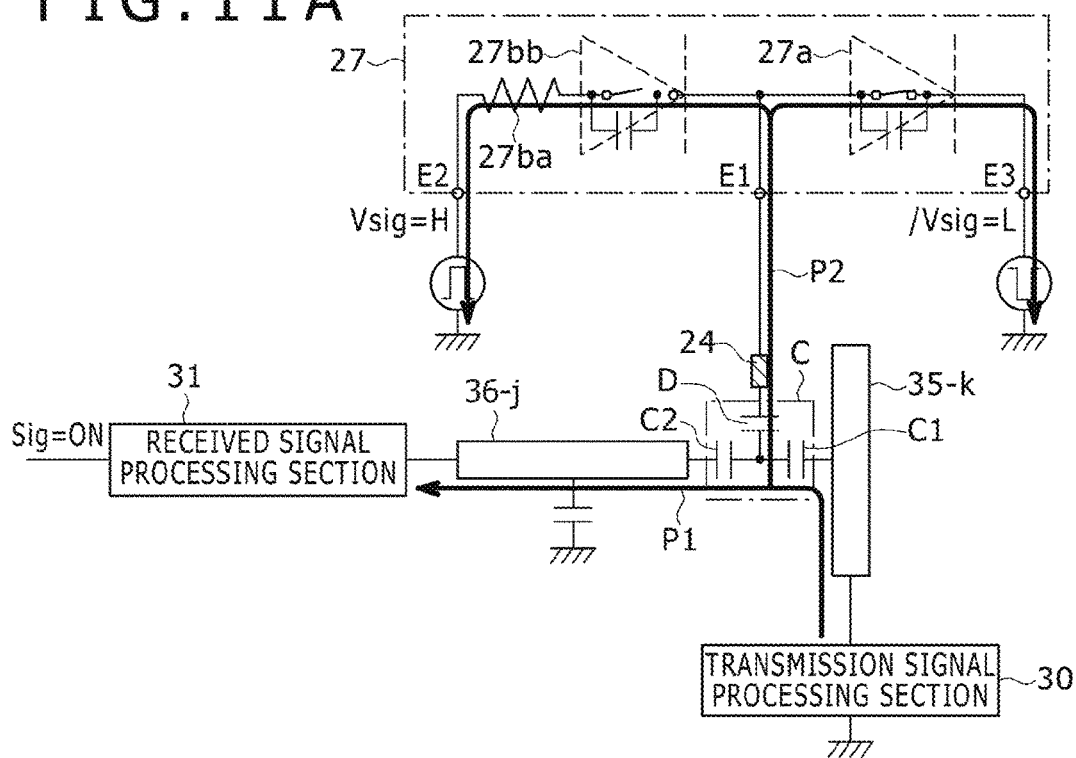
FIGS. 11A and 11B are diagrams showing example operating principles of the electrostatic pen shown in FIG. 10, FIG. 11A illustrating transmission of a high level, and FIG. 11B illustrating transmission of a low level.
Figure 11B:
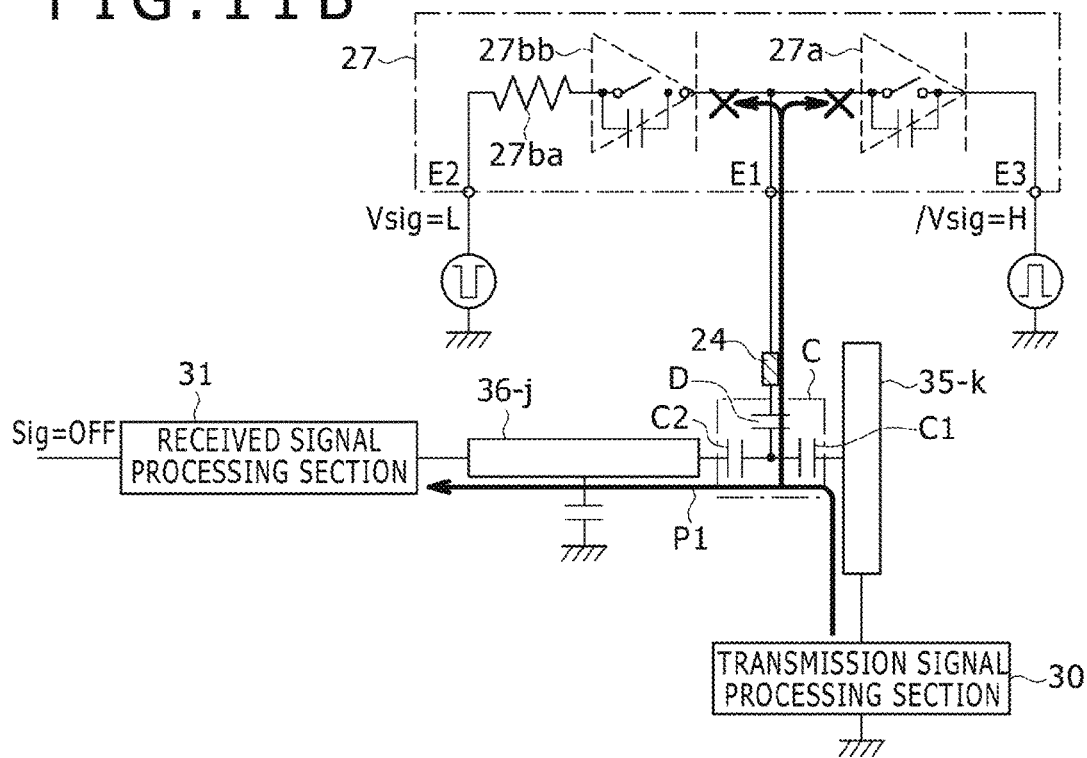
Figure 12:
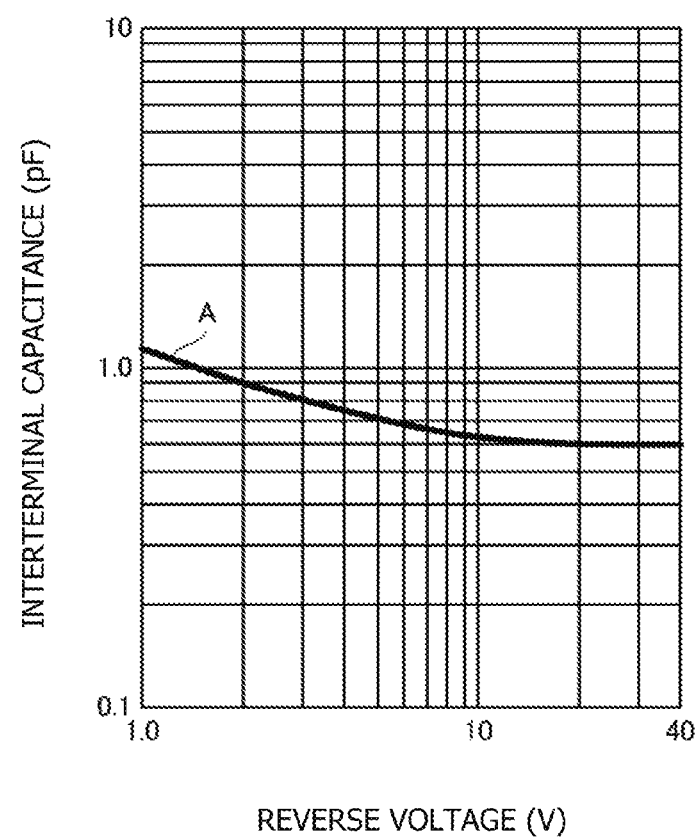
FIG. 12 is a diagram showing the reverse voltage-inter-terminal capacitance characteristic of an ordinary diode.

Because the third terminal part E3 is supplied with the inverted signal/Vsig, as shown in FIG. 11B, the first diode 27a and the second diode 27bb when the control signal Vsig is at a low level are in a reverse-biased state in which the respective cathodes of the first diode 27a and the second diode 27bb have potentials higher than the respective anodes of the first diode 27a and the second diode 27bb. As indicated by a characteristic curve A in FIG. 12, a diode generally has a property such that the higher the reverse voltage, the lower the interterminal capacitance of the diode. Because of this property, the interterminal capacitance of the diode in the reverse-biased state as described above is usually lower than in the case where the potential of the cathode and the potential of the anode are the same. Hence, the input system 1 according to the present embodiment can more reliably block a current flowing in from the first terminal part E1 to the electrostatic pen 2 than the second embodiment. It can also be said from another point of view that the input system 1 according to the present embodiment can block the current flowing in from the first terminal part E1 to the electrostatic pen 2 more reliably even when a PN diode rather than a PIN diode is used as the first diode 27a and the second diode 27bb.

The input system 1 according to the present embodiment has another effect of being able to use multilevel modulation for transmitting information from the electrostatic pen 2 to the touch sensor 3. A case where multilevel modulation is used will be described in detail in the following as a modification of the present embodiment.

The input system 1 according to the present modification realizes multilevel modulation by controlling the potential level of the control signal Vsig to two levels or more in a range in which a voltage across the first diode 27a is not a positive-direction voltage (non-positive range). For example, supposing that the potential level of the control signal Vsig is controlled to two levels of 1 V and 2 V, potential differences of four levels, that is, +2−(−2)=4 V, +1−(−1)=2 V, −1−(+1)=−2 V, −2−(+2)=−4 V can be applied between the second terminal part E2 and the third terminal part E3. Of the potential differences, −2 V and −4 V are potential differences within the non-positive range of the first diode 27a. The switch control signal output circuit 26c according to the present modification realizes multilevel modulation by using −2 V and −4 V falling within the non-positive range and at least one of the potential differences not falling within the non-positive range (4 V or 2 V in this case).

Referring to the characteristic curve A in FIG. 12 again, the interterminal capacitance of a diode has a property of monotonically decreasing with respect to the reverse voltage. Hence, stepwise control of the reverse voltage applied to the first diode 27a as described above can affect stepwise control of the current flowing from the first terminal part E1 into the electrostatic pen 2 after the control signal Vsig is changed to a low level. Utilizing this, the transmission control circuit 26b according to the present modification (see FIG. 10) controls the transmission level of data to a plurality of levels, thereby realizing data modulation by multilevel modulation. A procedure for data transmission and reception in the present modification will be concretely described in the following with reference to FIG. 4C and FIG. 5B.

Figure 4C:
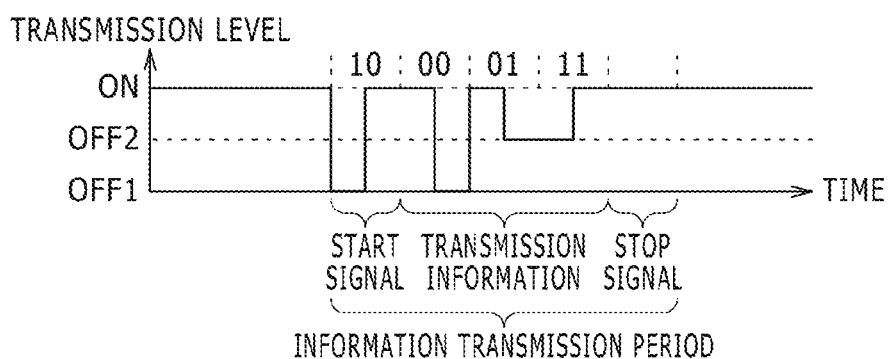
FIG. 4C is a diagram showing an example of a signal in a case where multilevel modulation is used.

As shown in FIG. 4C, the transmission control circuit 26b according to the present modification uses three levels "ON," "OFF2," and "OFF1" as the transmission levels of data. The transmission level "ON" corresponds to a state in which the switch section 27 is on. On the other hand, while the transmission levels "OFF2" and "OFF1" both correspond to a state in which the switch section 27 is off, voltages applied across the first diode 27a at the respective transmission levels are different from each other. In FIG. 4C, the reverse voltage applied across the first diode 27a is increased in order of the transmission levels "OFF2" and "OFF1."

Then, the transmission control circuit 26b according to the present modification controls the transmission level on the basis of a system that associates the contents of transmission information with combinations of directions of transitions of the transmission level and magnitudes of the transitions. Specifically, as shown in FIG. 4C, a fall from the transmission level "ON" to "OFF1" is associated with transmission information "00," a fall from the transmission level "ON" to "OFF2" is associated with transmission information "01," a rise from the transmission level "OFF1" to "ON" is associated with transmission information "10," and a rise from the transmission level "OFF2" to "ON" is associated with transmission information "11." As for a start signal and a stop signal, as shown in FIG. 4C, control of the transmission level in a similar manner to the transmission information "10" is performed for the start signal, and control is performed so as to fix the transmission level to "ON" for the stop signal. Data transmission by multilevel modulation is thus realized. Incidentally, in the above-described transmission level control, a rise from the transmission level "OFF1" to "OFF2" and a fall from the transmission level "OFF2" to "OFF1" are not associated with transmission information. However, the rise from the transmission level "OFF1" to "OFF2" and the fall from the transmission level "OFF2" to "OFF1" may of course be associated with transmission information as long as no problem occurs in position detection.

Figure 5B:
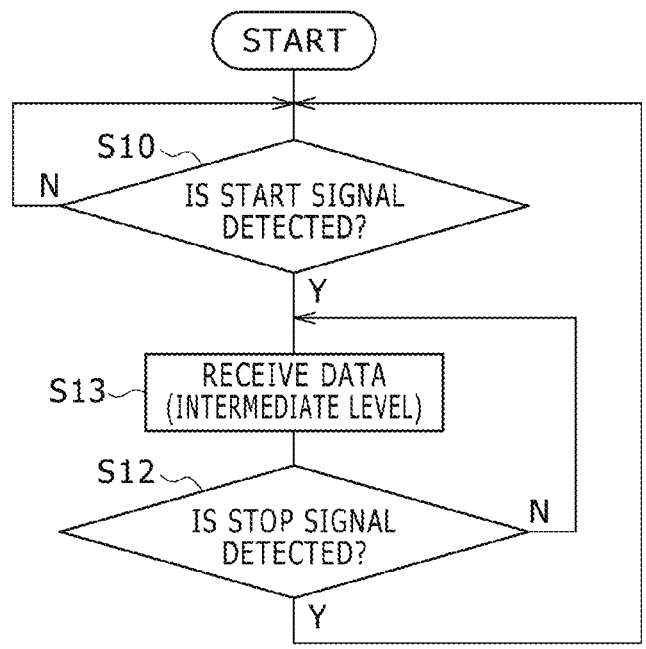

The information extraction processing section 33 (see FIG. 1) as a receiving side receiving data thus transmitted by using multilevel modulation receives the data using also the intermediate level, as shown in FIG. 5B. That is, the information extraction processing section 33 according to the above-described embodiment receives data transmitted by the electrostatic pen 2 by sequentially making binary threshold value determination for a series of signal values supplied from the control section 32. On the other hand, the information extraction processing section 33 according to the present modification receives data transmitted by the electrostatic pen 2 by sequentially making multilevel (three values in the example of FIG. 4C) threshold value determination for a series of signal values supplied from the control section 32 (step S13). The reception of data transmitted by multilevel modulation is thereby realized.

As described above, the input system 1 according to the present modification can control the current flowing from the first terminal part E1 to the third terminal part E3 to a plurality of levels through the control of the potential difference between the control signal Vsig and the inverted signal/Vsig to a plurality of levels. Thus, multilevel modulation can be used for transmission of information from the electrostatic pen 2 to the touch sensor 3. Hence, more information can be transmitted than in the case where binary modulation is used.

Example embodiments have been described above. However, the present disclosure is not at all limited to such embodiments. The present disclosure can of course be carried out in various modes without departing from the spirit of the present disclosure.

For example, in the foregoing embodiments, description has been made of cases where an electrostatic pen is used together with a touch sensor of a cross-point type mutual capacitance system. However, an electrostatic pen according to the present disclosure is applicable together with various types of sensors of a capacitance system that detects a change in capacitance. For example, an electrostatic pen according to the present disclosure is applicable together with sensors of a surface type capacitance system and other types of sensors of the projective type capacitance system (self-capacitance type and the like).

What is claimed is:
1. An electrostatic pen, comprising:
 a conductive main body;
 a pen point tip supported, via an insulator, by the conductive main body;
 an electrode included in the pen point tip;
 switch circuitry coupled to the electrode; and
 control circuitry which, in operation, controls supply of a voltage potential to the switch circuitry,
 wherein the switch circuitry includes:
  a first terminal coupled to the electrode,
  a second terminal and a third terminal coupled to the control circuitry,
  a resistive element coupled to the first and second terminals, and
  a diode having an anode coupled to the first terminal and a cathode coupled to the third terminal, and
 wherein the control circuitry, in operation, controls the supply of the voltage potential to the switch circuitry such that the switch circuitry has a plurality of voltage potential states including a first state in which a voltage potential of the second terminal is higher than a voltage potential of the third terminal and a first current flows from the electrode to the diode, and a second state in which the voltage potential of the second terminal is lower than the voltage potential of the third terminal and a second current flows from the electrode to the resistive element, a magnitude of the first current being greater than a magnitude of the second current.

2. The electrostatic pen according to claim 1, further comprising:
 a second diode having an anode coupled to the resistive element and having a cathode coupled to the first terminal.

3. The electrostatic pen according to claim 1 wherein the control circuitry, in operation, supplies a control signal to the second terminal.

4. The electrostatic pen according to claim 3 wherein the control signal is a binary signal, which, in operation, has a value of one of a high level and a low level.

5. The electrostatic pen according to claim 3 wherein the control circuitry, in operation, supplies an inverted signal of the control signal to the third terminal.

6. The electrostatic pen according to claim 5 wherein the control circuitry, in operation, controls a potential difference between the control signal and the inverted signal to have one of two or more levels.

7. The electrostatic pen according to claim 6 wherein the control circuitry, in operation, controls the potential difference between the control signal and the inverted signal to have one of two or more levels in a non-positive range of the first diode.

8. The electrostatic pen according to claim 5 wherein the first diode is a positive-negative diode.

9. The electrostatic pen according to claim 1 wherein the control circuitry is coupled to the conductive main body and supplies a ground potential through user contact with the conductive main body, supplies a high level potential to the second terminal in the first state, and supplies a low level potential to the second terminal in the second state, the low level potential being lower than the high level potential.

10. The electrostatic pen according to claim 1 wherein the first diode is a positive-intrinsic-negative diode.

11. The electrostatic pen according to claim 1 wherein,
the pen point electrode, in operation, electrostatically couples to a capacitance type sensor; and
the control circuitry, in operation, switches between the first state and the second state based on information to be transmitted from the electrostatic pen to the sensor.

12. The electrostatic pen according to claim 11 wherein the control circuitry, in operation, maintains the first state when information is not being transmitted to the sensor.

13. The electrostatic pen according to claim 11 wherein the control circuitry, in operation, controls transmission of the information by switching between the states, contents of the information being associated with a transition of a transmission level.

14. An electrostatic pen, comprising:
a conductive main body;
a pen point tip supported, via an insulator, by the conductive main body;
an electrode included in the pen point tip;
grounding circuitry;
switch circuitry coupled to the electrode; and
control circuitry which, in operation, controls supply of a voltage potential to the switch circuitry,
wherein the switch circuitry includes:
a first terminal coupled to the electrode,
a second terminal and a third terminal coupled to the control circuitry,
a resistive element coupled to the first and second terminals, and
a diode having an anode coupled to the first terminal and a cathode coupled to the third terminal, and
wherein the control circuitry, in operation, controls the supply of the voltage potential to the switch circuitry such that the switch circuitry has a plurality of voltage potential states including a first state in which a voltage potential of the second terminal is higher than a voltage potential of the third terminal and a first current flows from the electrode to the diode, and a second state in which the voltage potential of the second terminal is lower than the voltage potential of the third terminal and a second current flows from the electrode to the resistive element, a magnitude of the first current being greater than a magnitude of the second current,
wherein the control circuitry, in operation, controls transmission of information to an electronic apparatus having a capacitive type sensor by controlling an on-off state of the switch circuitry, and
wherein the control circuitry, in operation, electrically couples the pen point electrode to the grounding circuitry by setting the switch circuitry to an on state when information is not being transmitted to the electronic apparatus.

15. The electrostatic pen according to claim 14 wherein the control circuitry, in operation, holds the switch circuitry in an on state for a determined time before or after transmitting the information.

16. The electrostatic pen according to claim 14 wherein the control circuitry, in operation, controls a switching rate of the switch circuitry to generate an information signal of over 12 Hz.

17. The electrostatic pen according to claim 16 wherein the control circuitry, in operation, controls the switching rate of the switch circuitry at a frequency equal to or lower than half of a frequency corresponding to a scanning rate of the sensor.

18. The electrostatic pen according to claim 17 wherein the control circuitry, in operation, controls transmission of the information by turning the switch circuitry on and off to change transmission levels of the information signal, a direction of a transition of a transmission level being associated with contents of the information.

19. The electrostatic pen according to claim 18 wherein the switching rate is 24 Hz, and half of the frequency corresponding to the scanning rate of the sensor is 100 Hz.

20. The electrostatic pen according to claim 18 wherein the control circuitry, in operation, controls transmission of the information based on an association of a combination of the direction of the transition of the transmission level and a magnitude of the transition with the contents of the information.

21. The electrostatic pen according to claim 14 wherein the control circuitry, in operation, controls transmission of a determined start signal before starting transmission of the information, and controls transmission of a determined stop signal after ending the transmission of the information.

22. An electrostatic pen, comprising:
a conductive main body;
a pen point tip supported, via an insulator, by the conductive main body;
an electrode included in the pen point tip;
switch circuitry coupled to the electrode; and
control circuitry which, in operation, controls supply of a voltage potential to the switch circuitry,
wherein the switch circuitry includes:
a first terminal coupled to the electrode,
a second terminal and a third terminal coupled to the control circuitry,
a resistive element coupled to the first and second terminals, and
a diode having an anode coupled to the first terminal and a cathode coupled to the third terminal, and
wherein the control circuitry, in operation, controls the supply of the voltage potential to the switch circuitry such that the switch circuitry has a plurality of voltage potential states including a first state in which a voltage potential of the second terminal is higher than a voltage potential of the third terminal and a first current flows from the electrode to the diode, and a second state in which the voltage potential of the second terminal is lower than the voltage potential of the third terminal and a second current flows from the electrode to the resistive element, a magnitude of the first current being greater than a magnitude of the second current, and wherein the control circuitry, in operation, controls transmission of information to an electronic apparatus including a capacitive type sensor by controlling an on-off state of the switch circuitry to cause transitions of a transmission level, wherein a direction of a transition of the transmission level is associated with contents of the information.

23. A system, comprising:
a capacitive sensor; and
an electrostatic pen including:
  a conductive main body;
  a pen point tip supported, via an insulator, by the conductive main body;
  an electrode included in the pen point tip;
  switch circuitry coupled to the electrode; and
  control circuitry which, in operation, controls supply of a voltage potential to the switch circuitry,
wherein the switch circuitry includes:
  a first terminal coupled to the electrode,
  a second terminal and a third terminal coupled to the control circuitry,
  a resistive element coupled to the first and second terminals, and
  a diode having an anode coupled to the first terminal and a cathode coupled to the third terminal, and
wherein the control circuitry, in operation, controls the supply of the voltage potential to the switch circuitry such that the switch circuitry has a plurality of voltage potential states including a first state in which a voltage potential of the second terminal is higher than a voltage potential of the third terminal and a first current flows from the electrode to the diode, and a second state in which the voltage potential of the second terminal is lower than the voltage potential of the third terminal and a second current flows from the electrode to the resistive element, a magnitude of the first current being greater than a magnitude of the second current.

24. The system according to claim 23 wherein the switch circuitry, in operation, limits a current from flowing between the first terminal and the second terminal.

25. The system according to claim 24 wherein,
the pen point electrode, in operation, electrostatically couples to the capacitance type sensor; and
the control circuitry, in operation, switches between the first state and the second state based on information to be transmitted from the electrostatic pen to the capacitive sensor.

* * * * *

UNITED STATES PATENT AND TRADEMARK OFFICE
CERTIFICATE OF CORRECTION

PATENT NO. : 10,289,221 B2  
APPLICATION NO. : 15/473017  
DATED : May 14, 2019  
INVENTOR(S) : Tomohiro Kagami et al.

Page 1 of 1

It is certified that error appears in the above-identified patent and that said Letters Patent is hereby corrected as shown below:

On the Title Page

Item (73) Assignee:
"(73) Assignee: WACOM., LTD., Saitama (JP)" should read --(73) Assignee: WACOM CO., LTD., Saitama (JP)--

Signed and Sealed this
Twenty-fourth Day of December, 2019

Andrei Iancu
*Director of the United States Patent and Trademark Office*